United States Patent
Zhang et al.

(10) Patent No.: US 12,487,169 B2
(45) Date of Patent: Dec. 2, 2025

(54) BUBBLE DETECTION DEVICE AND SAMPLE PROCESSING INSTRUMENT

(71) Applicant: BECKMAN COULTER BIOTECHNOLOGY (SUZHOU) CO., LTD., Jiangsu (CN)

(72) Inventors: Ailin Zhang, Jiangsu (CN); Xi Liu, Jiangsu (CN); Ruifeng Miao, Jiangsu (CN); Xin Jin, Jiangsu (CN)

(73) Assignee: Beckman Coulter Biotechnology (Suzhou) Co., Ltd., Suzhou (CN)

( * ) Notice: Subject to any disclaimer, the term of this patent is extended or adjusted under 35 U.S.C. 154(b) by 205 days.

(21) Appl. No.: 18/262,560

(22) PCT Filed: Nov. 1, 2021

(86) PCT No.: PCT/CN2021/127869
§ 371 (c)(1),
(2) Date: Jul. 21, 2023

(87) PCT Pub. No.: WO2022/160837
PCT Pub. Date: Aug. 4, 2022

(65) Prior Publication Data
US 2024/0094108 A1    Mar. 21, 2024

(30) Foreign Application Priority Data
Jan. 28, 2021    (CN) .................. 202120243593.X

(51) Int. Cl.
*G01N 15/1434*    (2024.01)
*G01N 15/00*    (2006.01)
*G01N 15/10*    (2006.01)

(52) U.S. Cl.
CPC . *G01N 15/1434* (2013.01); *G01N 2015/0011* (2013.01); *G01N 2015/1006* (2013.01)

(58) Field of Classification Search
CPC ....... G01N 15/1434; G01N 2015/0011; G01N 2015/1006; G01N 21/85; G01N 15/1459
See application file for complete search history.

(56) References Cited

U.S. PATENT DOCUMENTS 4,318,481 A    3/1982 Lombardo et al.
4,538,733 A    9/1985 Hoffman
(Continued)

FOREIGN PATENT DOCUMENTS

CN    1950690 A    4/2007
CN    104862273 A    8/2015
(Continued)

OTHER PUBLICATIONS

Translation of JP2012063329A (Year: 2012).*
(Continued)

*Primary Examiner* — David P Porta
*Assistant Examiner* — Mamadou Faye
(74) *Attorney, Agent, or Firm* — Merchant & Gould P.C.

(57) ABSTRACT

A bubble detection device and a sample processing instrument are provided. The bubble detection device includes a body, a cover and a detection circuit board. The body includes a bottom wall and first and second side walls respectively extending from two sides of the bottom wall. The bottom, first and second side walls define a groove for accommodating a sample pipe of a sample processing instrument, and first and second holes are respectively provided in the first and second side walls to allow light from a light source to pass through the sample pipe. The cover includes a top portion for covering the groove and first and second side portions attached to the body. The detection circuit board includes the light source and a photoelectric sensor and is attached to the body such that they are aligned with the first and second holes respectively to sense intensity of (Continued)

the light passing through the sample pipe. The sample processing instrument includes the bubble detection device.

17 Claims, 6 Drawing Sheets

(56) References Cited

U.S. PATENT DOCUMENTS

| | | |
|---|---|---|
| 4,838,698 A | 6/1989 | Ishii et al. |
| 5,985,216 A | 11/1999 | Rens Willem et al. |
| 6,079,836 A | 6/2000 | Burr et al. |
| 6,767,188 B2 | 7/2004 | Vrane et al. |
| 6,880,414 B2 | 4/2005 | Norton |
| 7,201,875 B2 | 4/2007 | Norton et al. |
| 7,417,734 B2 | 8/2008 | Kanda |
| 7,443,491 B2 | 10/2008 | Kanda |
| 7,544,326 B2 | 6/2009 | Norton et al. |
| 7,639,358 B2 | 12/2009 | Kanda |
| 7,776,268 B2 | 8/2010 | Rich |
| 7,799,575 B2 | 9/2010 | Jiang |
| 7,821,631 B1 | 10/2010 | Javadi |
| 7,990,525 B2 | 8/2011 | Kanda |
| 8,140,300 B2 | 3/2012 | Dunne et al. |
| 8,187,888 B2 | 5/2012 | Rich |
| 8,233,146 B2 | 7/2012 | Chen |
| 8,303,894 B2 | 11/2012 | Rich |
| 8,358,412 B2 | 1/2013 | Kanda |
| 8,528,427 B2 | 9/2013 | Vrane et al. |
| 8,564,776 B2 | 10/2013 | Graves et al. |
| 8,665,439 B2 | 3/2014 | Luscher |
| 8,748,183 B2 | 6/2014 | Durack et al. |
| 8,767,212 B2 | 7/2014 | Kanda et al. |
| 9,034,259 B2 | 5/2015 | Kanda |
| 9,092,034 B2 | 7/2015 | Vrane et al. |
| 9,170,187 B2 | 10/2015 | Yan et al. |
| 9,207,166 B2 | 12/2015 | Bardell et al. |
| 9,429,276 B2 | 8/2016 | Katsumoto |
| 9,523,677 B2 | 12/2016 | Ball et al. |
| 9,562,860 B1 | 2/2017 | Pangarkar et al. |
| 9,645,080 B2 | 5/2017 | Matula et al. |
| 9,784,659 B2 | 10/2017 | Tanase et al. |
| 9,897,530 B2 | 2/2018 | Durack et al. |
| 10,031,061 B2 | 7/2018 | Rowlen et al. |
| 10,036,697 B2 | 7/2018 | Fox et al. |
| 10,451,534 B2 | 10/2019 | Otsuka et al. |
| 10,557,786 B2 | 2/2020 | Gibbons et al. |
| 10,627,331 B2 | 4/2020 | Chandler |
| 2004/0096931 A1* | 5/2004 | Kawashima ....... G01N 35/1004 435/287.1 |
| 2011/0061471 A1 | 3/2011 | Rich et al. |
| 2011/0259749 A1 | 10/2011 | Kanda |
| 2012/0308436 A1 | 12/2012 | Kanda |
| 2013/0007903 A1 | 1/2013 | Evans et al. |
| 2014/0051064 A1 | 2/2014 | Van Den Engh |
| 2014/0377771 A1 | 12/2014 | Bibette et al. |
| 2017/0241889 A1 | 8/2017 | Otsuka et al. |
| 2017/0248515 A1 | 8/2017 | Duckett, Jr. et al. |
| 2017/0307502 A1 | 10/2017 | Mason et al. |
| 2017/0350878 A1 | 12/2017 | Holmes et al. |
| 2020/0103406 A1 | 4/2020 | Holmes et al. |
| 2020/0158545 A1 | 5/2020 | Norton et al. |
| 2021/0338931 A1* | 11/2021 | Argersinger ...... A61M 5/16854 |

FOREIGN PATENT DOCUMENTS

| | | |
|---|---|---|
| CN | 105143851 A | 12/2015 |
| CN | 103517980 B | 9/2016 |
| CN | 104755906 B | 8/2017 |
| CN | 206818580 U | 12/2017 |
| CN | 107782657 A | 3/2018 |
| CN | 108169104 A | 6/2018 |
| CN | 207649728 U | 7/2018 |
| CN | 109070083 A | 12/2018 |
| CN | 208537364 U | 2/2019 |
| CN | 105980059 B | 8/2019 |
| CN | 111122422 A | 5/2020 |
| EP | 998672 A2 | 5/2000 |
| EP | 1574838 A1 | 9/2005 |
| EP | 1099105 B1 | 2/2006 |
| EP | 1757922 A1 | 2/2007 |
| EP | 1391717 B1 | 5/2008 |
| EP | 2702133 A1 | 3/2014 |
| EP | 2917718 A1 | 9/2015 |
| EP | 2984468 A1 | 2/2016 |
| EP | 2357464 B1 | 3/2016 |
| EP | 3189322 A1 | 7/2017 |
| EP | 3445490 A1 | 2/2019 |
| EP | 3090248 B1 | 6/2020 |
| JP | 2007-258227 A | 10/2007 |
| JP | 4-341771 B2 | 10/2009 |
| JP | 2012-063328 A | 3/2012 |
| JP | 2012063329 A * | 3/2012 |
| KR | 10-2024011 B1 | 9/2019 |
| WO | 1999005504 A2 | 2/1999 |
| WO | 2004051238 A1 | 6/2004 |
| WO | 2005106427 A1 | 11/2005 |
| WO | 2007018087 A1 | 2/2007 |
| WO | 2009078307 A1 | 6/2009 |
| WO | 2011144208 A2 | 11/2011 |
| WO | 2014127379 A1 | 8/2014 |
| WO | 2016035284 A1 | 3/2016 |
| WO | 2017072360 A1 | 5/2017 |
| WO | 2018065349 A1 | 4/2018 |
| WO | 2019127563 A1 | 7/2019 |

OTHER PUBLICATIONS

"Complete Book", Jan. 1, 2003 (Jan. 1, 2003), Instrumentation Reference Book (Third Edition), Elsevier Science, pp. 1086PP, XP040425409I SBN: 9780750671231: 286.

International Search Report and Written Opinion for PCT/CN2021/127869 (Feb. 3, 2022).

* cited by examiner

BUBBLE DETECTION DEVICE AND SAMPLE PROCESSING INSTRUMENT

This application is a U.S. National Stage Application of PCT/CN2021/127869, filed Nov. 1, 2021, which claims benefit of priority to Chinese Patent Application No. 202120243593.X, filed Jan. 28, 2021, and which applications are incorporated herein by reference in their entireties. To the extent appropriate, a claim of priority is made to each of the above-disclosed applications.

FIELD

The present application relates to a bubble detection device, which is configured to detect whether bubbles are present in a pipeline for transporting a sample in a sample processing instrument, e.g., a flow cytometer. The present application further relates to a sample processing instrument including the bubble detection device.

BACKGROUND

This section only provides background information related to the present disclosure, which is not necessarily prior art.

A sample processing instrument is generally configured to analyze or sort a sample containing, for example, microsomes or cells. The sample processing instrument includes a fluidic system for transporting various fluids to a flow cell, including a sample pipe for transporting a sample. When transporting a sample, if there are bubbles in the sample pipe, a processing result of the sample processing instrument will be affected.

In view of this, some sample processing instruments further include a bubble detection device. However, a difference between an output voltage detected in the case of presence of bubbles and an output voltage detected in the case of absence of bubbles is very small, for example, ranges between 200 millivolts and 300 millivolts. Therefore, it is easy to cause error detection results in the case of interference with the bubble detection device.

Therefore, it is desired in the art to provide a bubble detection device capable of detecting the presence or absence of bubbles with higher accuracy.

SUMMARY

This section provides a general summary of the disclosure and is not a comprehensive disclosure of its full scope or all of its features.

An object of the present application is to provide a bubble detection device capable of detecting the presence or absence of bubbles with higher accuracy.

Another object of the present application is to provide a sample processing instrument capable of improving the accuracy of processing results.

According to an aspect of the present application, a bubble detection device is provided. The bubble detection device includes a body, a cover and a detection circuit board. The body includes a bottom wall, a first side wall and a second side wall that respectively extend from two sides of the bottom wall, wherein the bottom wall, the first side wall and the second side wall together define a groove for accommodating a sample pipe of a sample processing instrument; and a first hole and a second hole are respectively provided on the first side wall and the second side wall to allow light from a light source to pass through the sample pipe. The cover includes a top portion for covering the groove, and a first side portion and a second side portion for being attached to the body. The detection circuit board includes the light source and a photoelectric sensor, wherein the body is attached to the detection circuit board, such that the light source is aligned with the first hole and the photoelectric sensor is aligned with the second hole to sense intensity of the light passing through the sample pipe.

In the bubble detection device according to the present application, a light path thereof is stable and may be sheltered by the cover, so interference from natural light can be prevented, thereby improving the accuracy of detection.

In some examples according to the present application, the central axis of the first hole and the central axis of the second hole coincide with each other, and both perpendicularly intersect the central axis of the sample pipe. In this way, it is possible to reduce scattering of the light beam, and improve the light utilization rate and the detection accuracy.

In some examples according to the present application, the groove is sized to be slightly smaller than an outer diameter of the sample pipe, so that the sample pipe is interference-fitted in the groove. In some examples according to the present application, a protrusion for positioning the sample pipe is provided on an inner surface of the top portion of the cover. With the construction, it is possible to prevent displacement or vibration of the sample pipe during the transportation or operation of the sample processing instrument, thereby improving the accuracy of detection.

In some examples according to the present application, a pin is provided on one of the body and the cover, and a recess portion for accommodating the pin in an interference fit manner is provided on the other one of the body and the cover. This attachment method can eliminate the use of special tools, so the operation is convenient.

In some examples according to the present application, the recess portion is bell-shaped or funnel-shaped. In some examples according to the present application, a slit is formed at the bottom of the recess portion. This configuration facilitates the guidance and insertion of the pin.

In some examples according to the present application, the recess portions are provided in the first side portion and the second side portion of the cover, and the pins extend from the first side wall and the second side wall outward in a direction transverse to the groove.

In some examples according to the present application, the pins are respectively provided on two sides of the first hole and two sides of the second hole. In this way, the attachment is more stable.

In some examples according to the present application, a first accommodating portion for accommodating the light source is provided on at least one of the first side wall and the first side portion, so that the light source is clamped between the first side wall and the first side portion. Additionally or alternatively, a second accommodating portion for accommodating the photoelectric sensor is provided on at least one of the second side wall and the second side portion, so that the photoelectric sensor is clamped between the second side wall and the second side portion. With this configuration, no special fastening structure or fasteners are needed to hold or fix the light source and the photoelectric sensor. In addition, a gap between the light source and the first hole, and a gap between the photoelectric sensor and the second hole are reduced, and the utilization rate of the light source is improved.

In some examples according to the present application, a handle for being grasped is provided on the top portion of the cover.

In some examples according to the present application, the body further includes: a mounting portion for mounting the body, wherein the mounting portion extends, in a longitudinal direction of the groove, from at least one end surface of a bottom wall of the detection portion; and/or a holding portion for accommodating and holding the sample pipe.

In some examples according to the present application, the mounting portion has a mounting hole for receiving a fastener; and/or, the holding portion has an accommodating groove in which the sample pipe is interference-fitted.

In some examples according to the present application, the detection circuit board further includes a temperature sensor and a light source driver; wherein the temperature sensor is configured to sense an ambient temperature; the light source driver is configured to determine and output a voltage or current for driving the light source according to the detected ambient temperature. The bubble detection device according to the present application takes the influence of the ambient temperature into account, and therefore can improve the accuracy of detection.

In some examples according to the present application, the temperature sensor includes an electronic component sensitive to the ambient temperature.

In some examples according to the present application, the light source driver includes a temperature compensation circuit, wherein the temperature compensation circuit is configured to: receive a forward break-over voltage that changes with the ambient temperature and is fed back from the temperature sensor; calculate a difference between the forward break-over voltage and a reference voltage; and obtain a compensated output voltage according to the difference and a set voltage. With the temperature compensation circuit, it is possible to solve a problem of output signal drift caused by changes in the ambient temperature.

In some examples according to the present application, the light source is a light source that emits an infrared light beam.

According to another aspect of the present application, a sample processing instrument including the above bubble detection device is provided. Therefore, the sample processing instrument also has the same beneficial effects as the above bubble detection device.

BRIEF DESCRIPTION OF THE DRAWINGS

The features and advantages of one or more embodiments of the present application will become more readily understood from the following description with reference to the accompanying drawings in which.

DETAILED DESCRIPTION

Figure 1:
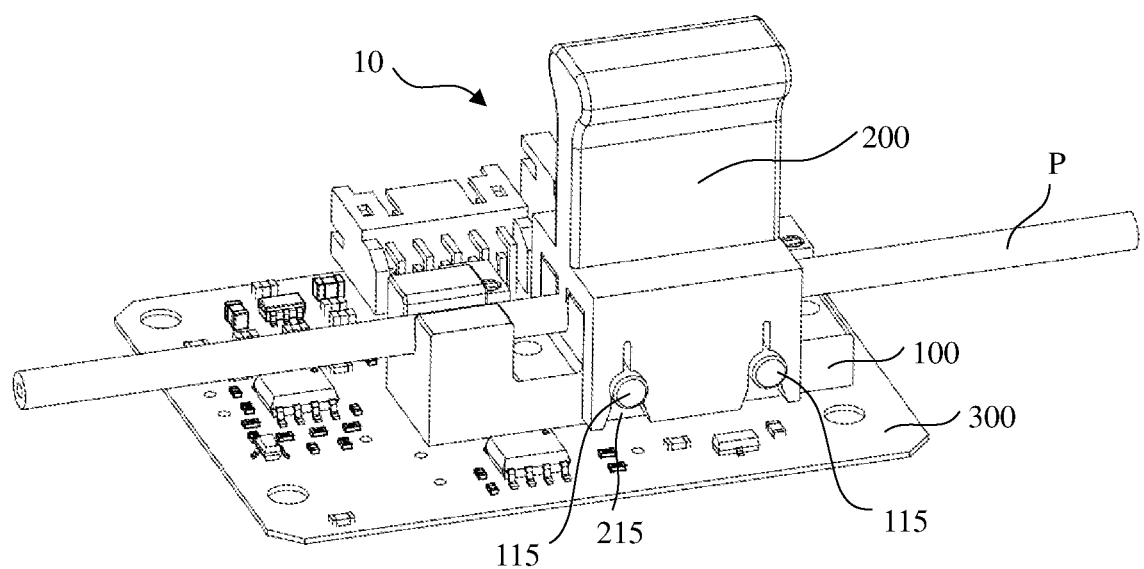
FIG. 1 is a schematic perspective view of a bubble detection device provided according to an embodiment of the present application.

Hereinafter, the present application will be described in detail by way of exemplary embodiments with reference to the accompanying drawings. In the several figures, like reference numerals indicate like parts and components. The following detailed description of the present application is only for purpose of illustration, and is by no means intended to limit the present application and the applications or usages thereof. The embodiments described in this specification are not exhaustive, but are only some of a number of possible embodiments. The exemplary embodiments may be implemented in many different forms, and should not be construed as limiting the scope of the present application. In some exemplary embodiments, well-known processes, well-known device structures, and well-known technologies may not be described in detail.

Hereinafter, the overall structure of the bubble detection device 10 according to the present application will be described with reference to FIGS. 1 and 2. The bubble detection device 10 according to the present application is configured to detect whether bubbles are present in a sample pipe of a sample processing instrument (not shown) that transports a sample from a sample container to a position for processing. It should be understood that the bubble detection device 10 according to the present application can be applied to any suitable sample processing instrument, for example, a flow cytometer or a sorter. The bubble detection device 10 determines whether bubbles are present in the sample flowing through the sample pipe by irradiating light emitted from a light source onto the sample pipe and acquiring the intensity of the transmitted light from the other side of the sample pipe. For example, the light source may emit infrared light. For example, the light source may be implemented as an LED light source.

Figure 2:
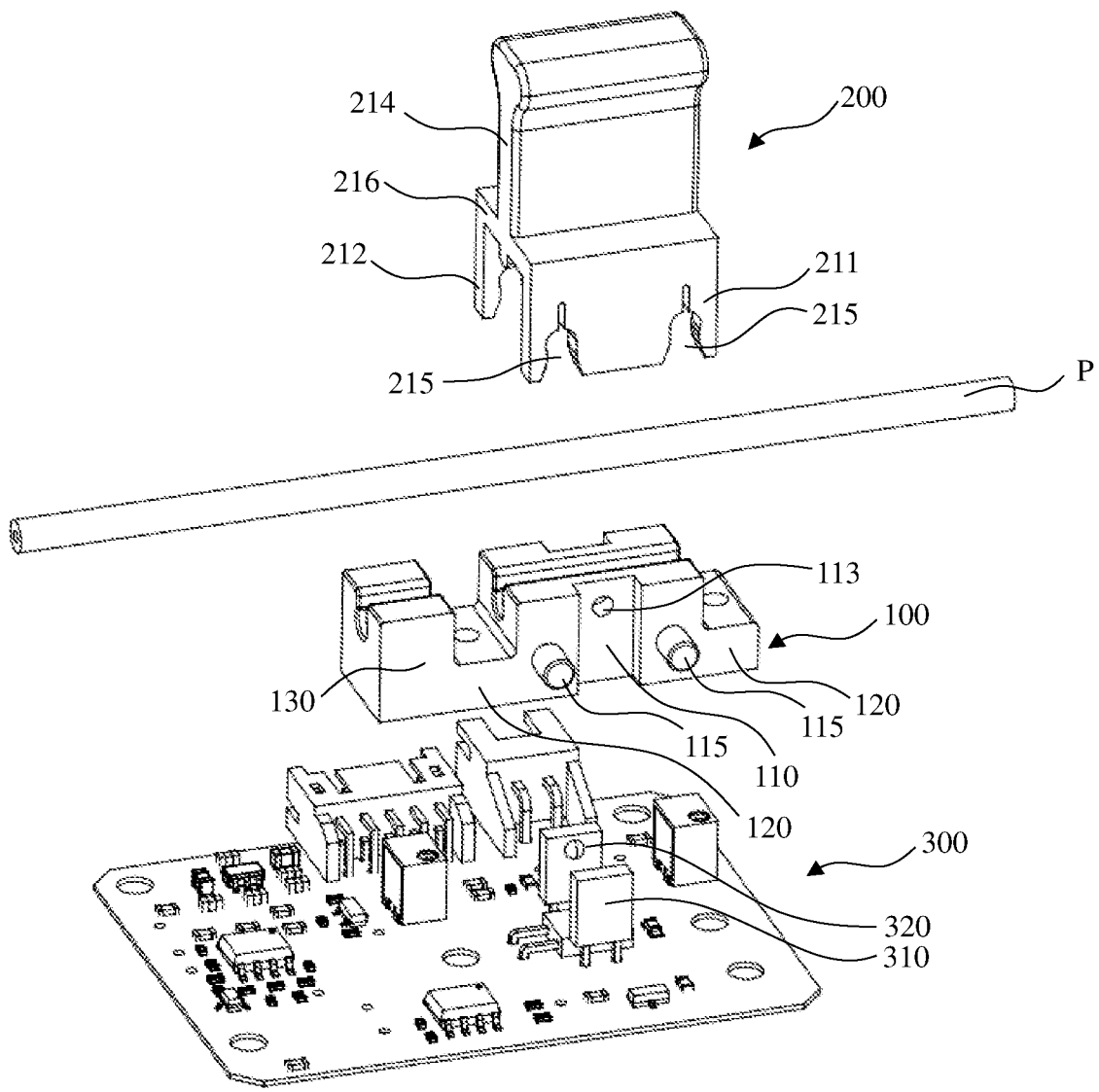
FIG. 2 is a schematic exploded view of the bubble detection device shown in FIG. 1.

FIG. 1 is a schematic perspective view of the bubble detection device 10 according to an embodiment of the present application. FIG. 2 is a schematic exploded view of the bubble detection device shown in FIG. 1. As shown in FIGS. 1 and 2, the bubble detection device 10 includes a body 100, a cover 200 and a detection circuit board 300. The cover 200 may be attached to the body 100 in a detachable manner. During assembling, the body 100 is attached to the detection circuit board 300; a sample pipe P is placed in the body 100; and finally the cover 200 is attached to the body 100. In the example of FIGS. 1 and 2, the body 100 is attached to the cover 200 by interference-fitting a pin 115 of the body 100 in a recess portion 215 of the cover 200. During disassembling, a force may be applied to the cover 200 to move the pin 115 out of the recess portion 215. This method of attachment and detachment does not require special tools for operation, so it is convenient and quick.

It should be understood that the attachment of the cover 200 and the body 100 is not limited to the specific example shown. For example, the cover 200 may be snapped on the body 100, or the cover 200 may be attached to the body 100 by a fastener such as a bolt.

Figure 3:
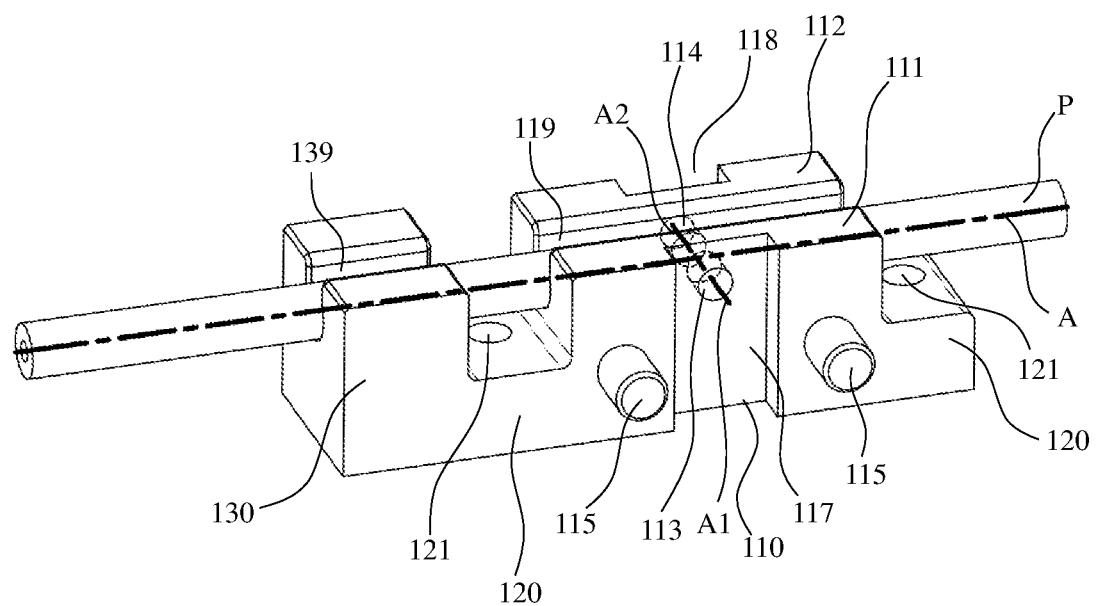
FIG. 3 is a schematic perspective view of a body of the bubble detection device shown in FIG. 1, a sample pipe being placed in the body.
Figure 4:
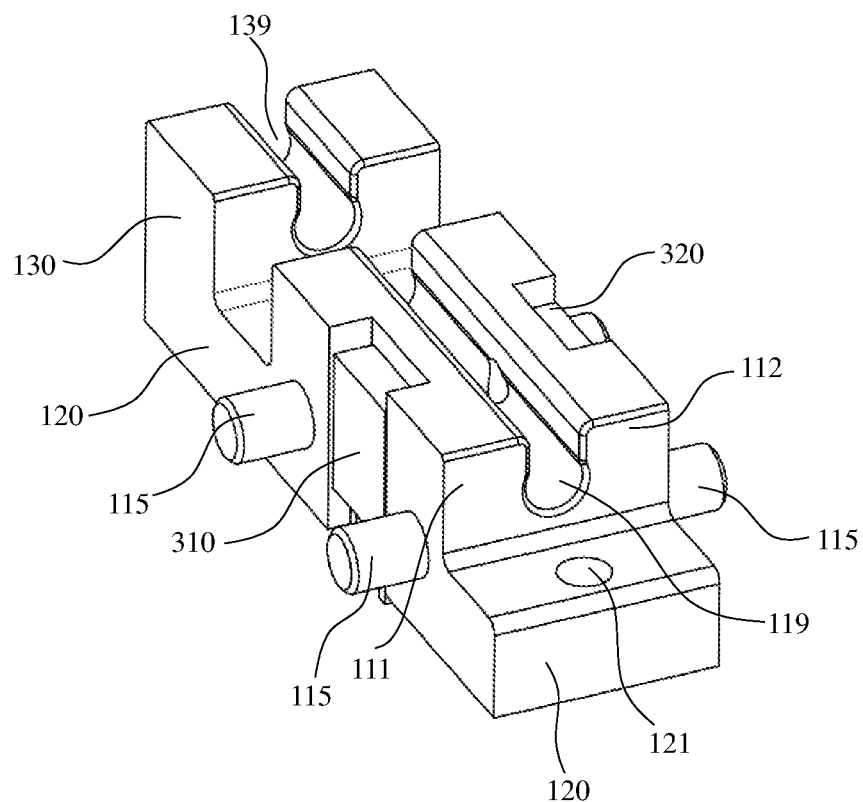
FIG. 4 is another schematic perspective view of the body of the bubble detection device shown in FIG. 1.
Figure 5:
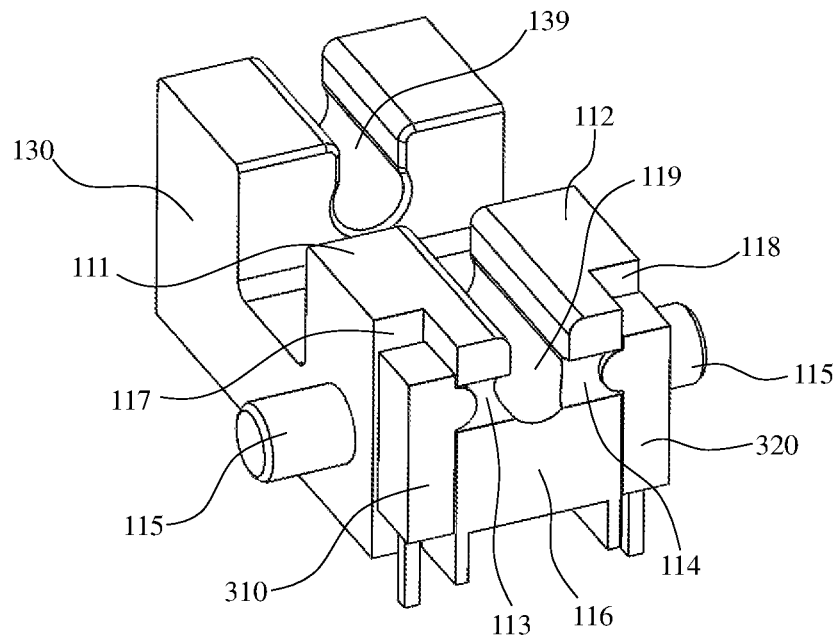
FIG. 5 is a schematic cut-away view of the body shown in FIG. 4 along a light path.

The body 100 of the bubble detection device 10 according to an embodiment of the present application will be described in detail below with reference to FIGS. 3 to 5. FIG. 3 is a schematic perspective view of the body 100 of the bubble detection device 10 shown in FIG. 1, the sample pipe P being placed in the body 100. FIG. 4 is another schematic perspective view of the body 100 of the bubble detection device 10 shown in FIG. 1. FIG. 5 is a schematic cut-away view of the body 100 shown in FIG. 4 along a light path.

As shown in FIGS. 3 to 5, the body 100 includes a detection portion 110, a mounting portion 120 and a holding portion 130. The detection portion 110 is configured to provide a light path for detection. The mounting portion 120 is configured to mount or attach the body 100. The holding portion 130 is configured to hold the sample pipe P to prevent the sample pipe placed in the detection portion 110 from flexing or moving, which is particularly advantageous for the sample pipe P in the form of a hose.

The detection portion 110 is substantially U-shaped, and includes a bottom wall 116 (referring to FIG. 5), a first side wall 111 and a second side wall 112 that respectively extend from two sides of the bottom wall 116. The bottom wall 116, the first side wall 111 and the second side wall 112 together define a groove 119. The groove 119 extends through the body 100, that is, extends from one end to the other end of the body 100, so as to accommodate the sample pipe P of the sample processing instrument. The direction of the central axis A of the sample pipe P is the longitudinal direction of the groove 119.

The groove 119 may be sized to be slightly smaller than the outer diameter of the sample pipe P so that the sample pipe P is interference-fitted in the groove 119. In this way, the sample pipe P can be prevented from moving or swinging in the groove 119. The accuracy of detection can be improved through the interference fit against vibration during transportation and operation of the sample processing instrument.

A first hole 113 and a second hole 114 are respectively defined on the first side wall 111 and the second side wall 112 to allow light from a light source 310 to pass through the sample pipe P. As shown in FIG. 2, the light source 310 and a photoelectric sensor 320 are provided on the detection circuit board 300. During assembling, the body 100 is fixed on the detection circuit board 300 with a mounting hole 121 thereof, such that the light source 310 on the detection circuit board 300 is aligned with the first hole 113 and the photoelectric sensor 320 is aligned with the second hole 114. During detection, the light emitted by the light source 310 passes through the first hole 113 and irradiates onto the sample pipe P, and the photoelectric sensor 320 receives via the second hole 114 the light passing through the sample pipe P and the sample inside the sample pipe P. The intensity of the light is acquired by the photoelectric sensor 320 to determine whether bubbles are present in the sample pipe P.

The first hole 113 and the second hole 114 respectively extend through the first side wall 111 and the second side wall 112 in a direction perpendicular to (or transverse to) the longitudinal direction of the groove 119. The first hole 113 and the second hole 114 may be in the form of circular holes, and respectively have central axes A1 and A2.

Preferably, the first hole 113 is aligned with the second hole 114, that is, the central axis A1 of the first hole 113 coincides with the central axis A2 of the second hole 114. Preferably, the central axis A1 of the first hole 113 and the central axis A2 of the second hole 114 may both perpendicularly intersect the central axis A of the sample pipe P. In this way, it is possible to shorten the light path, and reduce scattering of light when light beam propagates along the light path and thus improve the utilization rate of light. In addition, the structure is compact, and the accuracy of detection can be improved.

The first hole 113 and the second hole 114 may both have a size larger than the diameter of a fluid passage of the sample pipe P. The first hole 113 and the second hole 114 may have the same shape and size. It should be understood that the structure of the first hole 113 and the second hole 114 are not limited to the specific example shown, but may be varied according to the structure of the light source and the structure of the photoelectric sensor.

A first accommodating portion 117 may be provided on the outer side surface of the first side wall 111 to accommodate the light source 310. A second accommodating portion 118 may be provided on the outer side surface of the second side wall 112 to accommodate the photoelectric sensor 320. In this way, after the cover 200 is attached to the body 100, the light source 310 can be clamped or fixed between the first side wall 111 and a first side portion 211 (as shown in FIG. 2) of the cover 100, and the photoelectric sensor 320 can be clamped or fixed between the second side wall 112 and a second side portion 212 (as shown in FIG. 2) of the cover 100.

The pins 115 respectively extend outward from the first side wall 111 and the second side wall 112 in a direction transverse to the groove 119. The pins 115 may be in the form of a circular column, which facilitates insertion into the recess portion 215 of the cover 200. The pin 115 may be provided on each side of the first hole 113 (or the first accommodating portion 117). Similarly, the pin 115 may be provided on each side of the second hole 114 (or the second accommodating portion 118). In this way, it is possible to achieve a more stable attachment between the cover 200 and the body 100.

The mounting portion 120 extends from an end surface of the bottom wall of the detection portion 110 in the longitudinal direction of the groove 119. A mounting hole 121 is provided in the mounting portion 120 to receive a fastener such as a bolt. For example, the body 100 can be installed or fixed to a circuit board or another stationary structure (not shown) by screws or bolts.

In an example shown, two mounting portions 120 are respectively provided at two ends of the detection portion 110. It should be understood that the bubble detection device according to the present application is not limited to the specific example shown. For example, in the case of welding or adhesive, the mounting portion 120 may be omitted, or only one mounting portion 120 may be provided as required. For example, the mounting portion 120 may extend laterally (in a direction transverse to the groove) from the first side wall 111 and the second side wall 112.

The holding portion 130 extends from an end surface of the mounting portion 120 in the longitudinal direction of the groove 119. The holding portion 130 has an accommodating groove 139 for accommodating the sample pipe P. The sample pipe P is interference-fitted and thus held in the accommodating groove 139. The accommodating groove 139 may have the same structure as the groove 119, which can simplify the manufacturing procedure of the body. It should be understood that the accommodating groove 139 may have a different structure from the groove 119 as long as the sample pipe P can be clamped or held.

Figure 8:
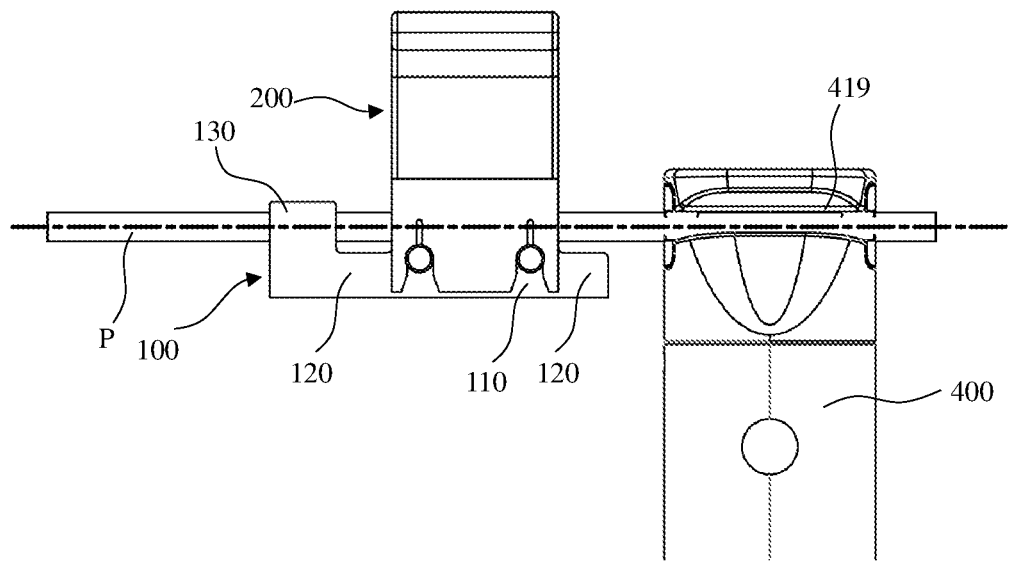
FIG. 8 is a schematic view showing the sample pipe held in the bubble detection device shown in FIG. 1.

In an example shown, only one holding portion 130 is provided. Referring to FIG. 8, a clamping point is provided on the left side of the detection portion 110 by the holding portion 130, and another clamping point is provided on the right side of the detection portion 110 by means of a pinch valve 400 (or any other suitable device) of the sample processing instrument. With the clamping of the holding portion 130 and the pinch valve 400, the sample pipe P can be linearly placed in the detection portion 110. The pinch valve 400 has an accommodating groove 419 for accommodating and holding the sample pipe P. The pinch valve 400 is configured to control on-off state of the sample pipe P. when the upper or lower portion of the accommodating groove 419 of the pinch valve 400 moves toward the other one, the sample pipe P is clamped to prevent the sample from passing through. Conversely, when the upper or lower portion of the accommodating groove 419 of the pinch valve 400 moves away from the other one, the sample pipe P is released to allow the sample to pass through.

Figure 9:
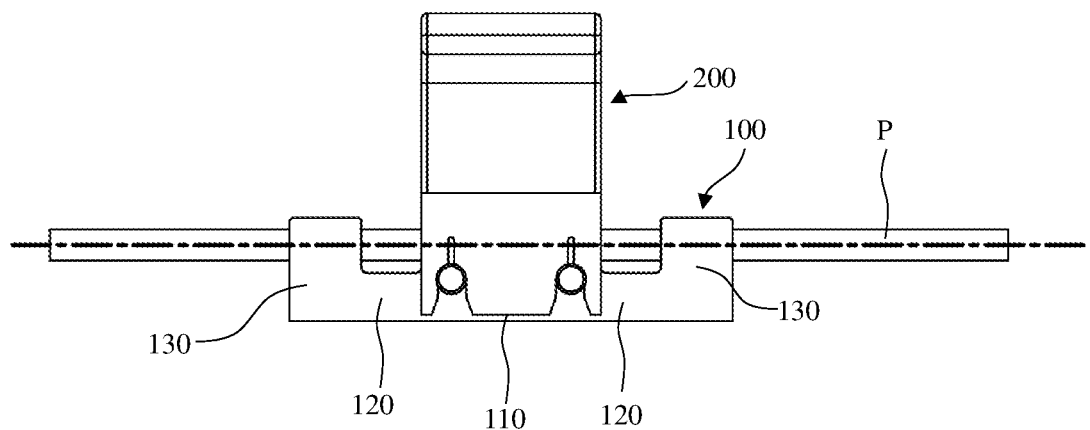
FIG. 9 is a schematic view of a bubble detection device according to another embodiment of the present application, which shows a sample pipe held in position.

It should be understood that the bubble detection device according to the present application is not limited to the specific example shown. For example, two holding portions 130 may respectively be provided at two ends of the mounting portion 120. As shown in FIG. 9, with the clamping of two holding portions 130, the sample pipe P can be straightly placed in the detection portion 110. For example, the position of the mounting portion 120 may be interchanged with the position of the holding portion 130. For example, in the case of omitting the mounting portion 120, the holding portion 130 may directly extend from the detection portion 110.

Figures 6, 7:
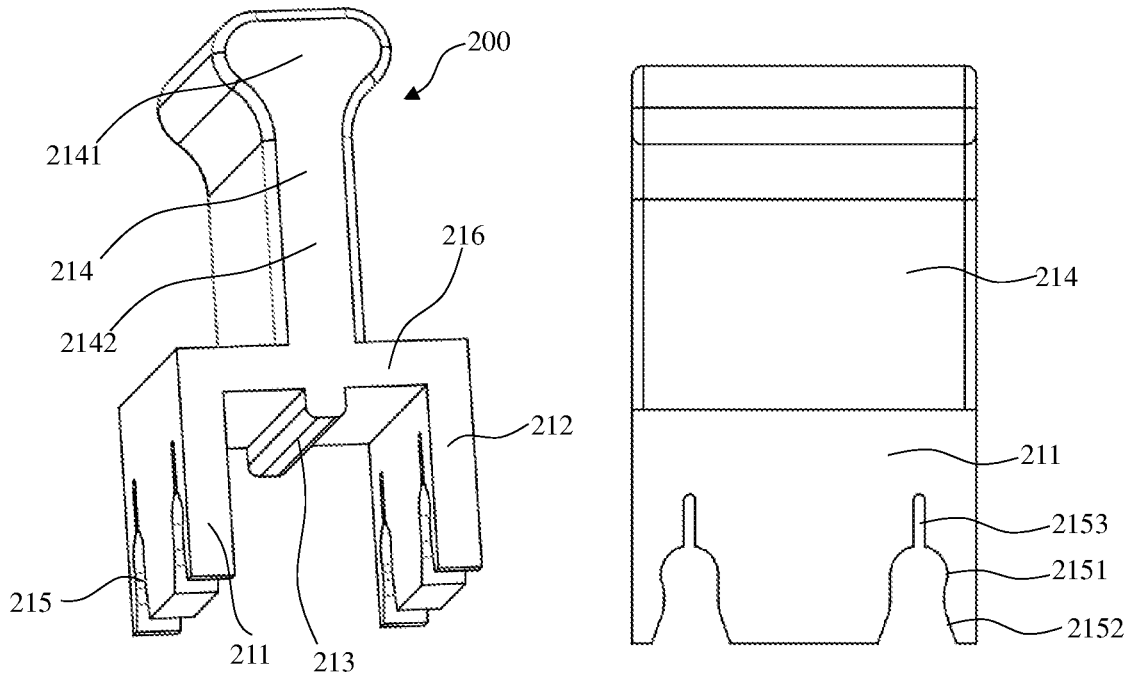
FIG. 6 is a schematic perspective view of a cover of the bubble detection device shown in FIG. 1.
FIG. 7 is a side view of the cover shown in FIG. 6.

The cover 200 of the bubble detection device 10 according to an embodiment of the present application will be described in detail below with reference to FIGS. 6 and 7. FIG. 6 is a schematic perspective view of a cover of the bubble detection device shown in FIG. 1. FIG. 7 is a side view of the cover shown in FIG. 6.

As shown in FIGS. 6 and 7, the cover 200 is substantially U-shaped, and includes a top portion 216, a first side portion 211 and a second side portion 212 that respectively extend from two sides of the top portion 216. The top portion 216 is configured to cover the groove 119 of the body 100. Since the groove 119 can be shielded by the cover 200, it is possible to prevent natural light from adversely affecting the detection, thereby improving the accuracy of the detection.

The first side portion 211 and the second side portion 212 are attached to the body 100, specifically attached to the first side wall 111 and the second side wall 112 of the body 100, respectively. As described above, by interference-fitting the pin 115 of the body 100 in the recess portion 215 of the cover 200, the body 100 is attached to the cover 200.

Referring to FIG. 7, the recess portion 215 for receiving the pin 115 includes an arc section 2151 that matches a portion of the pin 115, a diverging section 2152 extending outward from the arc section, and a slit 2153 that locates at the bottom of the arc section. The recess portion 215 has a bell shape or a funnel shape. The diverging section 2152 facilitates the insertion of the pin 115. The pin 115 passes through the diverging section 2152 and is interference-fitted in the arc section 2151. The slit 2153 can provide certain elasticity for two sides of the recess portion 215 to allow the two sides of the recess portion 215 to expand or contract when the pin 115 is inserted. The number and position of the recess portions 215 correspond to the number and position of the pins 115, which will not be described in detail herein.

It should be understood that the structure of the recess portion 215 is not limited to the specific example shown, but may be any other suitable structure that can realize the above functions. In addition, the pins 115 and the recess portions 215 may be interchangeably arranged, that is, the pins 115 may be provided on the cover 200 and the recess portions 215 may be provided on the body 100. Similarly, the structure of the pins 115, the positions of the pins 115 and the recess portions 215 may be varied, and are not limited to the specific example shown, as long as the above attachment function can be realized.

A protrusion 213 is provided on the inner surface of the top portion 216 of the cover 200 to position the sample pipe P. After the cover 200 is attached to the body 100, the protrusion 213 abuts against the sample pipe P to prevent displacement or vibration of the sample pipe P, thereby improving the accuracy of detection.

In an example shown, the protrusion 213 extends along the top portion 216 from one end to the other end of the top portion, and has a constant size. It should be understood that the shape, position and number of the protrusion 213 are not limited to the specific example shown, but may be varied as long as functions described herein can be realized.

A handle 214 for easy grasping may be further provided on the top portion 216 of the cover 200. The handle 214 includes a connecting portion 2142 extending from the top portion 216 and a grasping portion 2141 extending from the connecting portion 2142. The grasping portion 2141 is structured to be convenient for the operator to grasp, so that the cover 200 can be conveniently operated, for example, be attached or detached.

In an example shown, the handle 214 extends along the top portion 216 from one end to the other end of the top portion, and has a constant size. It should be understood that the shape, position and number of the handle 214 are not limited to the specific example shown, but may be varied as long as functions described herein can be realized.

Figure 10:
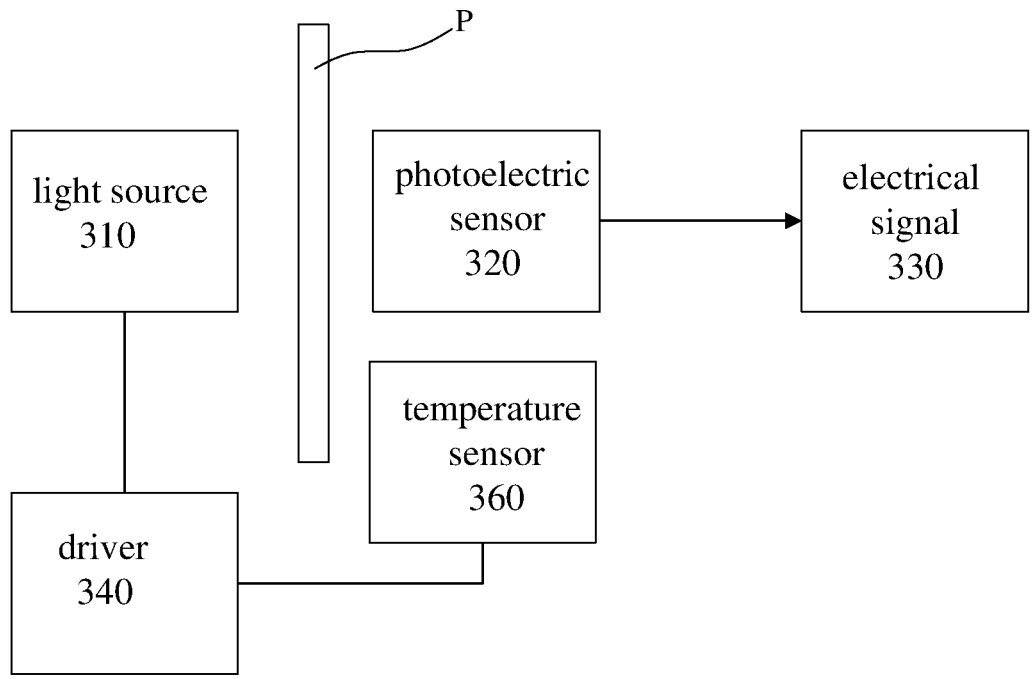
FIG. 10 is a schematic functional block diagram of a detection circuit of a detection circuit board according to an embodiment of the present application.
Figure 11:
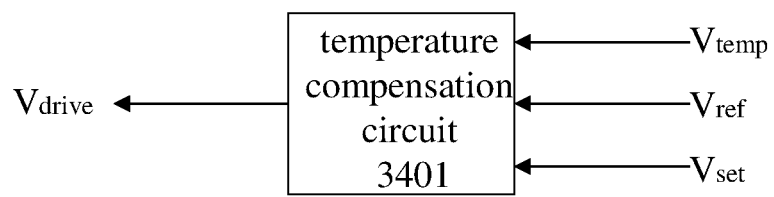
FIG. 11 is a schematic functional block diagram of a temperature compensation circuit according to an embodiment of the present application.

Detection circuit and detection method of the detection circuit board according to an embodiment of the present application will be described in detail below with reference to FIGS. 10 and 11. FIG. 10 is a schematic functional bock diagram of a detection circuit of a detection circuit board according to an embodiment of the present application. FIG. 11 is a schematic functional bock diagram of a temperature compensation circuit according to an embodiment of the present application.

The detection circuit board 300 is provided thereon with the light source 310 and the photoelectric sensor 320 as described above, and a light source driver (also referred to as a driver herein) 340 and a temperature sensor 360.

As shown in FIG. 10, during detection, on one side of the sample pipe P (the left side in the figure), the light source 310 emits light toward the sample pipe P, that is, illuminates the sample pipe P. On the other side of the sample pipe P (the right side in the figure), the photoelectric sensor 320 collects the light from the sample pipe P, converts light intensity signal into electrical signal (e.g., a detection voltage) 330, and outputs the electrical signal 330 to a corresponding processing unit or a controller (not shown) for processing and analysis to determine whether bubbles are present in the sample pipe P.

The light source 310 may be an LED light source, or any other suitable light source. The LED light source may be, for example, a light source that emits an infrared light beam. The photoelectric sensor 320 may be a photodiode, or may be any other element capable of sensing light intensity.

The light source 310 is driven by the driver 340. The driver 340 may be implemented as a constant current driver or a constant voltage driver, for example. The larger a drive voltage or drive current of the driver 340, the greater the intensity of light emitted from the light source 310, and correspondingly, the stronger the intensity of light collected by the photoelectric sensor 320 and the converted electrical signal. Conversely, the smaller the drive voltage or drive current of the driver 340, the lower the intensity of light emitted from the light source 310, and correspondingly, the weaker the intensity of light collected by the photoelectric sensor 320 and the converted electrical signal 330.

However, the detection circuit may be affected by ambient temperature. Generally, as the ambient temperature rises, the power of the light source will be decreased, causing the detected electrical signal to drift downward (i.e., the electrical signal output is decreased), and thereby causing the bubble detection result to be incorrect. Conversely, as the ambient temperature decreases, the power of the light source will be increased, causing the detected electrical signal to drift upward (i.e., the electrical signal output is increased), and thereby causing the bubble detection result to be incorrect. In view of this, the detection circuit according to the present application detects the ambient temperature around the light source by the temperature sensor 360.

The detected ambient temperature is fed from the temperature sensor 360 to the driver 340. The driver 340 changes the output drive voltage or drive current according to the feedback ambient temperature to compensate for the output drift of the electrical signal caused by the ambient temperature, thereby ensuring the correctness of the detection result.

The temperature sensor 360 may be any temperature-sensitive element, for example, a temperature-sensitive electronic element. The electronic element is, for example, a diode. In this way, the temperature sensor 360 may be electrically connected to the driver 340.

The driver 340 may include a temperature compensation circuit 3401. FIG. 11 shows an example of the temperature compensation circuit. As shown in FIG. 11, the temperature compensation circuit 3401 may receive a forward break-over voltage $V_{temp}$ fed back from the temperature sensor (e.g., a temperature-sensitive diode) 360, a set voltage $V_{set}$, and a reference voltage $V_{ref}$. A voltage compensation value $\Delta$ is determined according to the difference between the forward break-over voltage $V_{temp}$ coming from the temperature sensor 360 and the reference voltage $V_{ref}$. Based on the compensation value $\Delta$ and the set voltage $V_{set}$, a drive voltage $V_{drive}$ can be determined and output.

For example, in a case that the ambient temperature detected by the temperature sensor 360 rises, the forward break-over voltage $V_{temp}$ decreases and the compensation value $\Delta$ increases, so the output drive voltage $V_{drive}$ increases accordingly. The drive voltage $V_{drive}$ increases, so that the intensity of the light emitted from the light source 310 increases, and the intensity of the light collected by the photoelectric sensor 320 increases, thereby increasing the electrical signal (output voltage) outputted to compensate for the downward drift caused by the ambient temperature.

In a case that the ambient temperature detected by the temperature sensor 360 decreases, the forward break-over voltage $V_{temp}$ increases and the compensation value $\Delta$ decreases, so the output drive voltage $V_{drive}$ decreases accordingly. The drive voltage $V_{drive}$ decreases, so that the intensity of the light emitted from the light source 310 decreases, and the intensity of the light collected by the photoelectric sensor 320 decreases, thereby decreasing the electrical signal (output voltage) outputted to compensate for the upward drift caused by the ambient temperature.

The above temperature compensation circuit can be realized by various electronic components (diodes, resistors, etc.) and electrical connections between them, so it has a lower cost and a stable performance.

It should be understood that the detection circuit and the temperature compensation circuit according to the present application are not limited to the examples described herein, but may be varied as long as the above functions can be realized.

According to another aspect of the present application, a sample processing instrument including the above bubble detection device is provided. Therefore, the sample processing instrument also has the same advantages as the above bubble detection device.

Although the present application has been described with reference to exemplary embodiments, it should be understood that the present application is not limited to the specific embodiments described and illustrated herein. Without departing from the scope defined by the claims, those skilled in the art can make various modifications to the exemplary embodiments. The features in the various embodiments can be combined with each other in the case of no contradiction. Alternatively, a certain feature in the embodiments may also be omitted.

The invention claimed is:

1. A bubble detection device, comprising:
   a body comprising a detection portion, wherein the detection portion comprises a bottom wall, a first side wall and a second side wall that respectively extend from two sides of the bottom wall, and wherein the bottom wall, the first side wall and the second side wall define a groove for accommodating a sample pipe of a sample processing instrument, and wherein a first hole and a second hole are respectively provided in the first side wall and the second side wall to allow light from a light source to pass through the sample pipe, wherein a central axis of the first hole and a central axis of the second hole coincide with each other, and perpendicularly intersect a central axis of the sample pipe;
   a cover comprising a top portion for covering the groove, and a first side portion and a second side portion for being attached to the body; and
   a detection circuit board comprising the light source and a photoelectric sensor, wherein the body is attached to the detection circuit board, such that the light source is aligned with the first hole and the photoelectric sensor is aligned with the second hole to sense intensity of the light passing through the sample pipe.

2. The bubble detection device according to claim 1, wherein the groove is sized to be slightly smaller than an outer diameter of the sample pipe, so that the sample pipe can be interference-fitted in the groove.

3. The bubble detection device according to claim 1, wherein a protrusion is provided on an inner surface of the top portion of the cover to position the sample pipe.

4. The bubble detection device according to claim 1, wherein a pin is provided on one of the body and the cover, and a recess portion is provided on the other one of the body and the cover to receive the pin in an interference fit manner.

5. The bubble detection device according to claim 4, wherein the recess portion has a bell shape or a funnel shape.

6. The bubble detection device according to claim 5, wherein a slit is provided at the bottom of the recess portion.

7. The bubble detection device according to claim 6, wherein the recess portions are arranged in the first side portion and the second side portion of the cover, and the pins extend outward from the first side wall and the second side wall in a direction transverse to the groove.

8. The bubble detection device according to claim 7, wherein the pins are respectively provided on two sides of the first hole and two sides of the second hole.

9. The bubble detection device according to claim 1, wherein a first accommodating portion is provided on at least one of the first side wall and the first side portion to accommodate the light source, so that the light source is clamped between the first side wall and the first side portion; and/or a second accommodating portion is provided on at least one of the second side wall and the second side portion to accommodate the photoelectric sensor, so that the photoelectric sensor is clamped between the second side wall and the second side portion.

10. The bubble detection device according to claim 1, wherein a handle for being grasped is provided on the top portion of the cover.

11. The bubble detection device according to claim 1, wherein the body further comprises: a mounting portion for mounting the body, wherein the mounting portion extends, in a longitudinal direction of the groove, from at least one end surface of a bottom wall of the detection portion; and/or a holding portion for accommodating and holding the sample pipe.

12. The bubble detection device according to claim 11, wherein the mounting portion has a mounting hole for receiving a fastener; and/or the holding portion has an accommodating groove in which the sample pipe is interference-fitted.

13. The bubble detection device according to claim 1, wherein the detection circuit board further comprises a temperature sensor and a light source driver; the temperature sensor is configured to sense an ambient temperature; the light source driver is configured to determine and output a voltage or current for driving the light source according to the detected ambient temperature.

14. The bubble detection device according to claim 13, wherein the temperature sensor comprises an electronic component sensitive to the ambient temperature.

15. The bubble detection device according to claim 14, wherein the light source driver comprises a temperature compensation circuit configured to: receive a forward break-over voltage that changes with the ambient temperature and is fed back from the temperature sensor, calculate a difference between the forward break-over voltage and a reference voltage, and obtain a compensated output voltage according to the difference and a set voltage.

16. The bubble detection device according to claim 1, wherein the light source is a light source that emits an infrared light beam.

17. A sample processing instrument comprising the bubble detection device according to claim 1.

* * * * *